April 24, 1962  M. STEENBECK ETAL  3,031,390
PROCESS FOR PRODUCING NUCLEAR REACTOR FUEL
Filed April 22, 1959
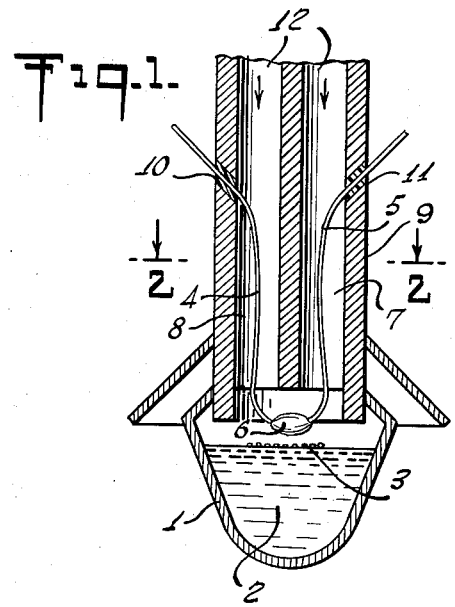
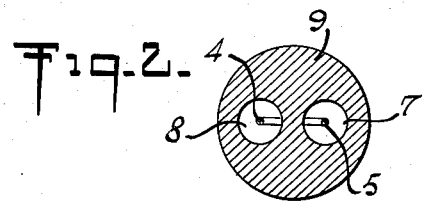
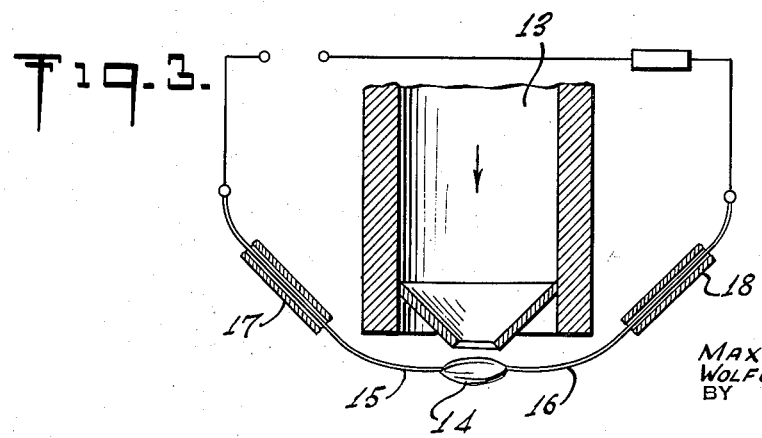
INVENTORS
MAX STEENBECK
WOLFGANG SCHIMMEL
BY
ATTORNEYS

United States Patent Office 3,031,390
Patented Apr. 24, 1962

3,031,390
PROCESS FOR PRODUCING NUCLEAR REACTOR FUEL
Max Steenbeck, Jena, and Wolfgang Schimmel, Berlin-Friedrichshagen, Germany, assignors to Wissenschaftlich-Technisches Buro fur Reaktorbau, Berlin-Niederschoneweide, Germany
Filed Apr. 22, 1959, Ser. No. 808,276
Claims priority, application Germany Apr. 24, 1958
8 Claims. (Cl. 204—154.2)

The present invention relates to a process for producing nuclear reactor fuel of any desired grain-size in a melt of a carrier-metal.

In the known methods for making nuclear reactor fuels of desired grain-size in a melt of a carrier-metal, considerable difficulties are encountered due to the fact that the wettability of the particles of the metal yielding the nuclear fuel by the metal of the carrier metal is exceedingly low. As a consequence, only certain combinations of nuclear fuel metals and carrier-metals can be realized; it is sometimes necessary to dilute to a considerable extent the nuclear fuel by forming alloys with elements having a higher neutron capture range in order to accomplish wettability. However, these alloys have the disadvantage that the individual grains are capable of exchanging matter by way of the carrier-metal melt. In this manner, some grains may grow at the expense of other grains and this causes a constant shift of distribution of grains of different size in an undesirable manner. Clogging in the pipe system or the containers may thereby be caused.

It is the object of the present invention to overcome the above-mentioned drawbacks of known methods and to provide nuclear fuels for reactors having a desired grain-size and distribution in a carrier metal.

This can be accomplished according to the invention by allowing hydrogen gas to react with the metallic element yielding the nuclear fuel and with the melt of the carrier metal, after having split up molecular hydrogen (H$_2$) and having converted it, at least for the major part, into atomic hydrogen (H). The effect of this treatment consists of a substantial de-oxidation of both the particles of the nuclear fuel and of the carrier metal, more particularly, at their boundary surfaces, and of maintaining them protected against renewed oxidation. In this manner, the particles of the nuclear fuel metal are properly wetted and enclosed by the carrier metals.

In carrying out the process according to the invention, molecular hydrogen is preferably passed through an electric arc, for example supplied by high frequency current, to the melt of a carrier metal; as carrier metals we mention lead or bismuth, or an alloy of these metals (which is eutectic); or one of the metals, lead or bismuth, or both, in an alloy with tin, lithium, sodium and/or potassium. At the surface of the mentioned melt of the carrier metal, there is a distribution of granular particles of the metal yielding the nuclear fuel to be incorporated in the carrier metal, said granular metal consisting of uranium, thorium or plutonium, or alloys or compounds of these elements with each other or with other elements. By passing the hydrogen through the electric arc, at least the major portion thereof is converted into atomic hydrogen which is the de-oxidizing agent for the nuclear fuel particles and the carrier metal. The de-oxidized metals are then capable of wetting each other and the particles of the carrier melt surround the nuclear fuel particles thus causing an intimate incorporation of the latter in the carrier metal melt.

The size of the grains of nuclear fuel can vary in accordance with the type and purpose of the reactor. As a general rule we may state that grain sizes from 10$^{-4}$ cm. to 1 cm. have proved very satisfactory.

According to one embodiment of the invention, when it is desired to prepare nuclear fuel metals of a special purity, the metal reduced by means of atomic hydrogen is surrounded with liquid metal, e.g. mercury, and is thereby protected against renewed oxidation. The mercury may be distilled off in an inert medium or in vacuo and the pure metal isolated thereby.

In the following, the process according to the invention will be more fully described with reference to the accompanying drawing which illustrates by way of example two embodiments of the invention.

In the drawing:

FIG. 1 shows, schematically and in vertical section, one embodiment of a device for carrying out the process according to the invention;

FIG. 2 is a cross-section along line II—II of FIG. 1; and

FIG. 3 shows part of another embodiment of the device, in vertical section.

Referring now to the drawing, FIG. 1 shows at 1 a crucible which is filled with a eutectic lead-bismuth alloy, designated by 2 and forming the melt of the carrier metal. At the surface of the melt are distributed grains 3 consisting of nuclear fuel to be incorporated in the melt. In this example, the grains consist of uranium. Above the cruicible 1, a tube 9 is arranged for the admission of molecular hydrogen which flows downward in the direction of the arrows 12 through two conduits 7 and 8. Two electrodes 4 and 5 for forming the arc are mounted in the wall of tube 9 and passed therethrough in gas-tight fixtures 10 and 11. The electrodes are so arranged that the arc 6 is formed in close proximity of the grains 3.

As the H$_2$ passes through the arc, the major part thereof is converted into atomic hydrogen which acts immediately on the particles of the nuclear fuel and on the melt of the carrier metal, whereby all particles are de-oxidized, particularly at the boundary surfaces, and are, in this medium of hydrogen, protected against renewed oxidation. The metal surfaces of both the nuclear fuel and the carrier metal are so pure that a perfect wetting of the two metals is achieved and a complete penetration of the fuel metal into the carrier metal will be effected.

As a consequence of the process carried out in accordance with the invention, a nuclear fuel having a very homogeneous quality will be obtained so that the above-mentioned difficulties have been completely overcome.

In the embodiment shown in FIG. 3, molecular purified hydrogen (H$_2$) is passed through tube 13 to an arc 14. The arc is formed by means of electrodes 15 and 16 which are passed in through lead-in conduits 17 and 18. Direct or alternate current may be used for forming the arc. Amperage and output depend on the type and size of the apparatus, which in the part omitted in this showing, substantially corresponds to the one shown in FIG. 1. With a crucible of 100 cc. capacity, a high frequency current of 100 kHz. of a transmitter having an output of 10 kw. is used.

The electrodes are made preferably of tungsten.

In carrying out the process for practical purposes, it is advantageous to provide thermic shielding devices or the like in order to prevent the admission of oxygen as far as possible.

In order to illustrate the process of the invention in further detail, an example is given in the following, but it should be understood that the disclosure contained therein relates only to a preferred embodiment of the invention, and that it is intended to cover all changes and modifications of the example, which do not constitute a departure from the spirit of the invention and the scope of the appended claims.

Example

In an apparatus of the type shown in FIG. 1 and which comprises a crucible of 100 cc. capacity, a melt of a eutectic alloy of lead and bismuth was poured which came up almost to the edge of the cruible. On the surface of the melt, grains of uranium were placed which had an average size of less than one mm. During the test, the melt was maintained in liquid state by known heating means. Molecular hydrogen was injected into the apparatus at a pressure of 1–3 atm. gauge and was passed through an electric arc produced by a high frequency current of 100 kHz. The molecular hydrogen which under the influence of the arc is split up into atomic hydrogen, was made to act directly on the metals present. It de-oxidized the surface of the uranium grains and removed simultaneously the oxide skin from the melt of the alloy thus causing the mutual wetting of the metals and the penetration of the uranium grains into the eutectic melt, and their even distribution therein. At the end of the operation, which was carried on over a period of minutes the homogeneous distribution of the grains in the carrier metal could be detected by the customary means of observation.

What is claimed is:

1. A process for producing nuclear reactor fuels of desired grain size in a melt of a carrier metal, which comprises placing grains of a nuclear fuel selected from the group consisting of uranium, thorium and plutonium, alloys of said metals and compounds of said metals on the surface of a metallic melt, said metallic melt serving as a carrier metal, the metal in said melt being a member selected from the group consisting of lead, bismuth, and an alloy of lead and bismuth, and contacting said metallic grains and said metallic melt with a current of atomic hydrogen (H), thereby de-oxidizing the surfaces of said grains and said carrier metal and causing the grains to become wetted by said carrier metal and to become evenly incorporated in said carrier metal melt.

2. The process as claimed in claim 1, wherein the metal forming the carrier melt is alloyed with a metal selected from the group consisting of tin, lithium, sodium and potassium.

3. The process as claimed in claim 1, wherein the carrier metal consists of a eutectic alloy of lead and bismuth.

4. The process as claimed in claim 1, wherein the grain size of said nuclear fuel ranges from $10^{-4}$ cm. to 1 cm.

5. The process as claimed in claim 1, wherein said atomic hydrogen is obtained by passing molecular hydrogen ($H_2$) through an electric arc.

6. The process as claimed in claim 5, wherein said arc is produced by high frequency of 100 kHz.

7. The process as claimed in claim 1, wherein the grains of the nuclear fuel after the de-oxidation with atomic hydrogen, are contacted with mercury as a protection against reoxidation, and are thereafter recovered in pure state by distilling off the mercury in an inert medium.

8. The process as claimed in claim 1, wherein grains of the nuclear fuel, after the de-oxidation with atomic hydrogen, are contacted with mercury as a protection against reoxidation, and are thereafter recovered in pure state by distilling off the mercury in vacuo.

References Cited in the file of this patent

AEC document BNL-75, September 15, 1950, available from Tech. Info. Service, Industrial Reports Section, P.O. Box 1001, Oak Ridge, Tenn.